United States Patent [19]

Doyama

[11] 4,417,531
[45] Nov. 29, 1983

[54] SEWING MACHINE WITH ELECTRONIC CONTROLLED STITCH PATTERN GENERATOR

[75] Inventor: Umeo Doyama, Tokyo, Japan

[73] Assignee: Riccar Company, Ltd., Tokyo, Japan

[21] Appl. No.: 14,487

[22] Filed: Feb. 23, 1979

[30] Foreign Application Priority Data

Mar. 2, 1978 [JP] Japan .................................. 53-22778
Jun. 14, 1978 [JP] Japan .................................. 53-80363
Jul. 24, 1978 [JP] Japan .................................. 53-89498

[51] Int. Cl.³ .............................................. D05B 3/02
[52] U.S. Cl. ................................................ 112/158 E
[58] Field of Search ................... 112/158 E, 275, 277, 112/121.11, 121.12

[56] References Cited

U.S. PATENT DOCUMENTS

| | | | |
|---|---|---|---|
| 3,847,100 | 11/1974 | Garron | 112/158 E |
| 3,987,739 | 10/1976 | Wurst et al. | 112/158 E |
| 4,005,664 | 2/1977 | Garron | 112/158 E |
| 4,086,862 | 5/1978 | Makabe et al. | 112/158 E |
| 4,122,786 | 10/1978 | Tanimoto et al. | 112/158 E |
| 4,135,462 | 1/1979 | Brown | 112/158 E |
| 4,142,473 | 3/1979 | Itoh | 112/158 E |
| 4,218,982 | 8/1980 | Daido et al. | 112/158 E |

*Primary Examiner*—Peter P. Nerbun
*Attorney, Agent, or Firm*—Sigalos & Levine

[57] ABSTRACT

In a sewing machine having a memory for storing stitch pattern data, a plurality of pattern selection switches, each corresponding to at least one of said stored patterns, and a microprocessor for accessing said stitch patterns in accordance with a selected pattern switch, the improvement comprising multiple data words stored in said memory for each stitch pattern beginning with a starting address, means coupled to said memory for selecting the starting address of a selected, stored stitch pattern, and means coupled to said memory for successively gating each data word of the selected stitch pattern to said stitch forming mechanism to form said selected stitch pattern.

8 Claims, 7 Drawing Figures

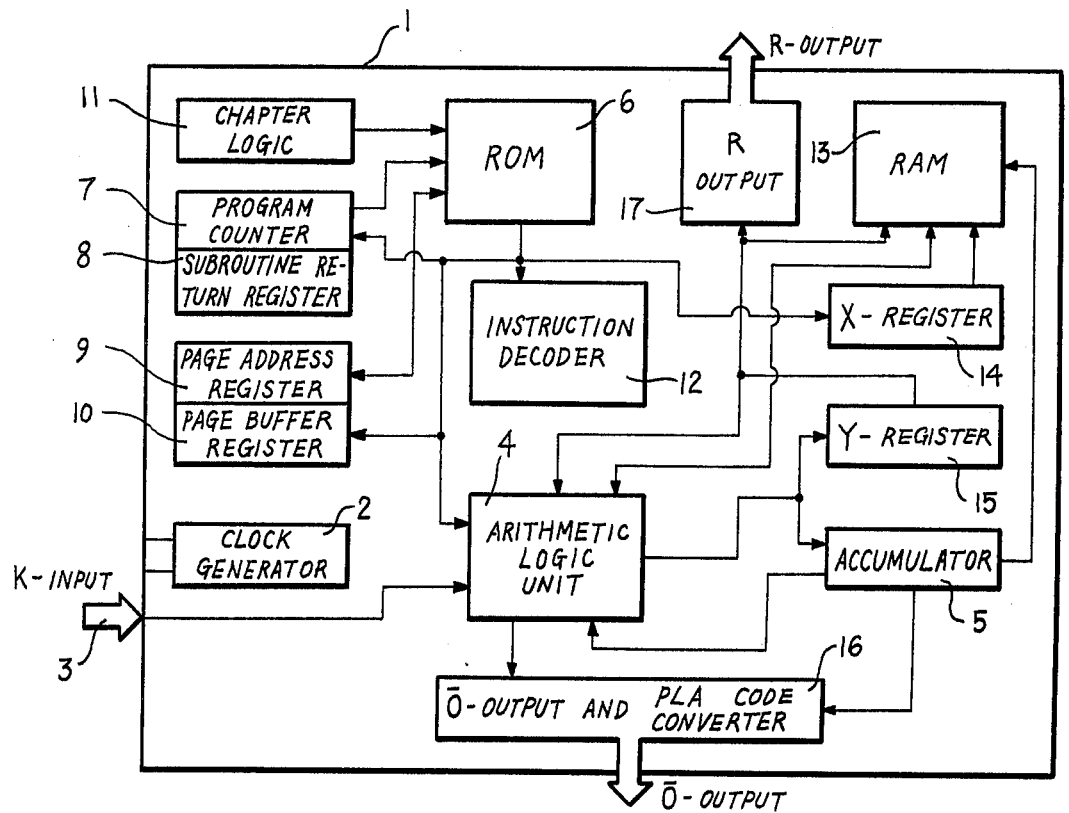
FIG. 1
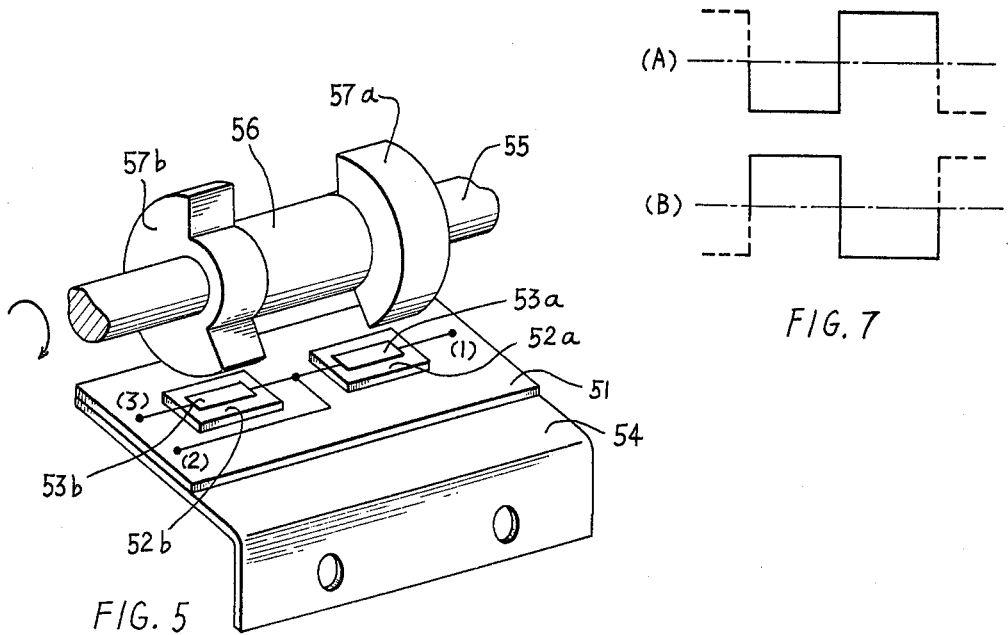
FIG. 5
FIG. 7

SEWING MACHINE WITH ELECTRONIC CONTROLLED STITCH PATTERN GENERATOR

BACKGROUND OF THE INVENTION

It is known in the prior art that stitch process information such as bight and work feed instruction can be stored in a static memory such as, for example, a read only memory (ROM).

When a key for selecting a pattern stitch is pressed, a code corresponding to the selected key can be generated by the encoder connected with said key switch and a first address of the stitch pattern is retrieved from the static memory and set in an address counter for use by the address memory unit. In response to synchronous timing pulses, the data for position of bight and work feed of the stitch pattern are fed sequentially from the memory to drive the bight and work feed mechanism. For selecting one of multiple stitch patterns, a multiple selection key on the indicating panel and a shifting switch on said panel can be combined into a composite encoder system and a digital "1" and "0" respectively can be generated as the composite code. Such a system, however, is rather complicated.

Another method of selecting different stitching patterns is by the use of a pressure difference of touch on multiple additional keys. However, the number of keys that can be utilized for selecting such a stitch pattern is restricted considering the limited space available in a sewing machine.

Also considered in the prior art was a method of synchronizing the signal for needle movement with respect to stitch performance with timing of the stitch pattern information. To accomplish this synchronization, an integrated circuit combining a Hall effect element with a multi-stage amplifier has been proposed. In that system, the Hall effect element is placed opposite a permanent magnet. Between the Hall effect element and the magnet, a disc having a magnetic shielding portion is revolved with the main shaft of the sewing machine. As a result, a potential difference is developed at the Hall IC output as the magnetic element is alternately shielded and unshielded. The potential difference can be used as a synchronizing pulse.

However, there are defects involved in the use of this method. First, there are so many different stitch patterns and large amounts of control data to be stored in the memory unit and such small volume and limited space available with a home-use sewing machine that a special integrated circuit element must be developed. Accordingly, compact integration of an exclusive use memory and the use of a control unit is inevitable which causes production costs to be fairly high. Moreover, it is required to change machine types frequently and, in such case, since the stitch pattern signals change, the integrated circuit must change. Thus, this method is not favorable for home-use sewing machines. On the other hand, if a stitch pattern selection device utilizes a combined panel key and selection switch, the mechanical structure is so complicated as to create problems. It may cause error selection and also it is inconvenient because a two-step operation is necessary for a required pattern selection.

To select different stitch patterns by pressure differences of key touch, such as light touch and strong press, it is not only inconvenient to operate, but also requires a complicated pressing mechanism which induces errors in operation.

When a Hall effect device is used for generating a synchronous signal, the Hall effect element acts as a current sensing element. This element always carries such a large current in comparison to the magnetic resistance element which is utilized in the present invention that is caused inferior temperature characteristics and may possibly cause erroneous operation when the hot temperature occurs. Further, the output voltage of a Hall element is so low that it is necessary to add an amplifier circuit. Accordingly, it is compulsory to use an integrated IC with the Hall element which is expensive and thus undesirable.

SUMMARY OF THE INVENTION

The object of this invention is to improve stitch pattern generation and overcome the defects of the prior art.

It is another object of this invention to improve predetermined stitch pattern generation in a sewing machine by electronic control.

Other objects and advantages of this invention will become apparent from the description given herein after.

The basic element of this invention for stored memory and control of stitch pattern data is the use of a one-chip microcomputer. By storing the control program and the stitch pattern data into ROM (read only memory) in such a microcomputer, a low priced, economical unit is easily available with fairly short delivery time in the commercial market in large quantities. It is desirable to make the different stitch patterns available by a simple selection circuit which is processed by a control program utilizing a key matrix with a cross point or intersection of the input and output lines.

BRIEF DESCRIPTION OF THE DRAWINGS

The subject matter of the invention is particularly pointed out and distinctly claimed in the concluding portion of this specification. The invention, itself, however, both as to organization and method of operation, together with further objects and advantages thereof may best be understood by reference to the following description taken in connection with the accompanying drawings:

FIG. 1 is a block diagram of a one-chip microcomputer known as Texas Instruments TMS-1100 which is utilized by this invention.

FIG. 5 is a perspective view of the cam mechanism and the detector unit of the synchronous signal generator.

FIG. 6 (B) is an end view of the same cam mechanism.

FIG. 7 (A) and (B) illustrate the voltage output waveforms developed by the synchronous generator cams respectively with different phases of inversion. 00518

DESCRIPTION OF THE PREFERRED EMBODIMENT

Figure 2:
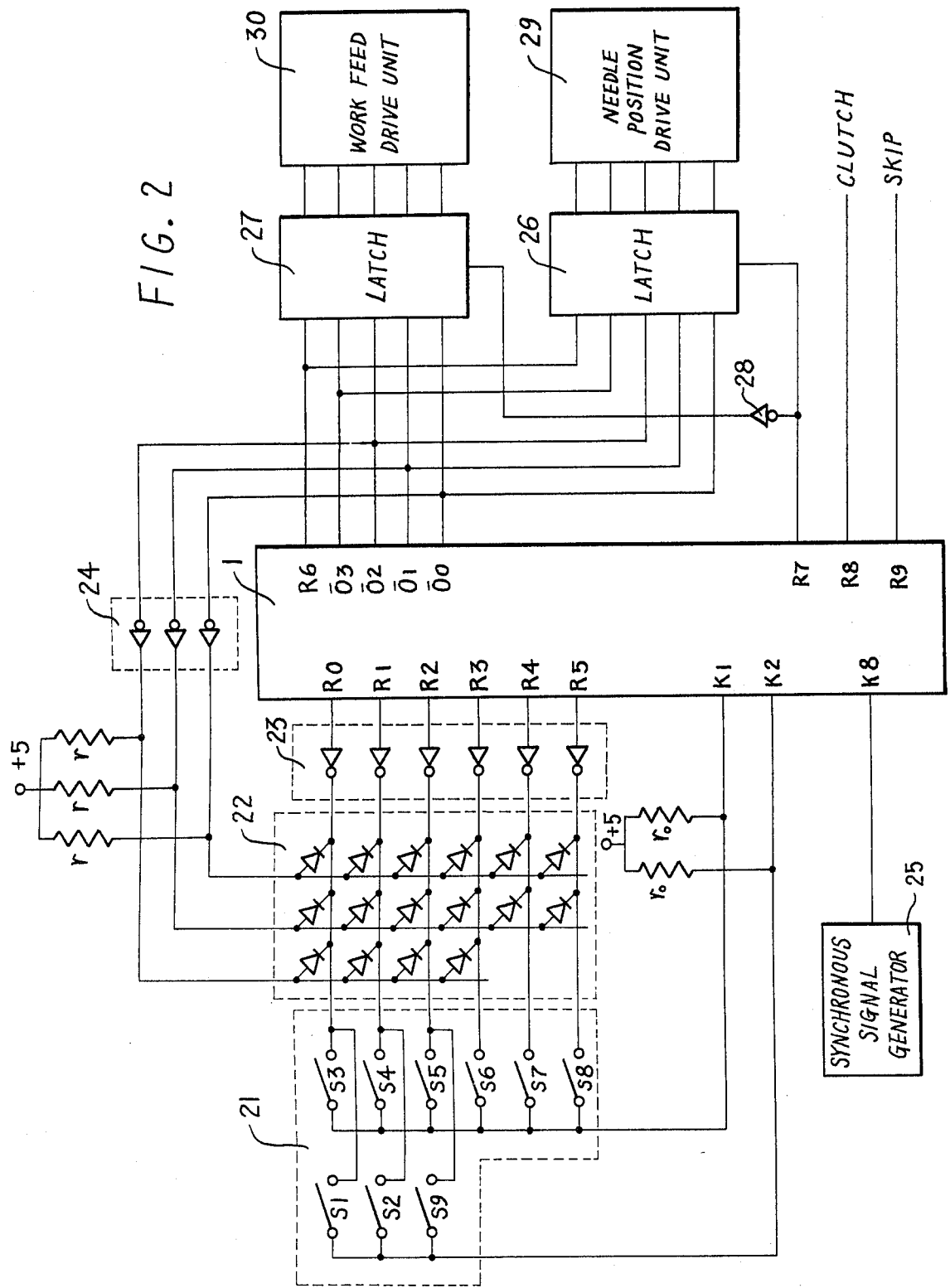
FIG. 2 is a block diagram of pattern selection unit showing how the peripheral circuit is to be connected to the input and output terminals of the microcomputer shown in FIG. 1.

FIG. 1 of the drawings is a block diagram of the one-chip microcomputer 1 known as TMS-1100 and produced by the Texas Instruments Company. One-chip microcomputer 1 is controlled by timing pulses of 250 kHz to 350 kHz from the clock pulse generator 2. ROM (read only memory) 6 of this one-chip microcomputer 1 contains 2 chapters and each chapter is composed of 16 pages where each page consists of 64 words. Accordingly, ROM 6 has a total storage capacity of 2,048 words, and 1 word consists of 8 bits. It can be word addressed by 6 bit counter 7 and page addressed by 4 bit page address register 9 respectively. The chapters are labelled "0" and "1" and are selected by chapter logic 11. In the program, usual programs which are called frequently, for example, initial clear set, chattering suppression and output program, are stored as subroutine programs in a specified area of ROM (read only memory) 6. At the time of calling up such a subroutine program, the content of program counter 7 at the moment is transferred for temporary storage into subroutine return register 8 and the content of page address register 9 into page buffer register 10 respectively and in such manner the return address can be assured.

Random access memory (RAM) 13 can have data both read from and written into it at an address determined by a matrix formed by X register 14 and Y register 15 and has total storage capacity of 512 bits which contains 8 files wherein each file is composed of 16 words and one word consists of 4 bits. The 8 files of RAM can be selected by 3 bits of data from X register 14. The R output (described later) is also determined by 4 bits of data from Y register 15.

The arithmetic logic unit 4 is connected to accumulator 5, Y register 15, RAM 13 and K input 3 and can execute comparisons, add and subtract. The result of the arithmetic operations is stored into Y register 15 or accumulator 5.

K input 3 is composed of 3 inputs, K1, K2, and K8 (see FIG. 2), and can be coupled into arithmetic logic unit 4 where the input data are checked for either the presence or absence of a "1" level and the result stored in accumulator 5. 0 output 16 is a parallel output circuit of 4 bits $\overline{00}$, $\overline{01}$, $\overline{02}$ and $\overline{03}$ and can be arranged as either 8 bits parallel output or 4 bits parallel output by the instruction from the program logic array (PLA). R output 17 consists of 10 lines of latch output each of which can be set and reset independently. These 10 latches of R output 17 can be used as outputs for control terminal addressing by Y register 15 and also be combined with the K input to form the key matrix control as mentioned later. Instruction decoder 12 is composed of an instruction program logic array which can decode instructions stored in the ROM program and can execute the instructions.

FIG. 2 is a diagrammatic showing of how said microcomputer 1 may be arranged for stitch selection, memory and control and with a key matrix interconnected with the R output of microcomputer 1. The R0 to R5 outputs are used as drive lines and the K inputs to computer 1, K1 and K2, are used receive lines. The stitch pattern selection switches 21 are connected to the drive lines R0 through R5. A plurality of LEDs (light emitting diodes) 22 are used as stitch pattern displays and are connected to drive lines R0 to R5 through open collector inverters 24 to the outputs from $\overline{0}$ output 16, such as $\overline{00}$, $\overline{01}$ and $\overline{02}$ as shown in the FIG. 2. Inverters 23 are inserted in the R0 to R5 drive lines for satisfying the fairly high current demand of LED lighting.

The resistors, r0, connected to receive line terminals K1 and K2 of K-input 3 and the resistors, r, connected to the output line of inverter 24 are all pull up resistors. A synchronous pulse is supplied from synchronous signal generator 25 to K8 of K-input 3 circuit in timed relation with each machine main shaft revolution. On the other hand, stitch data is available on lines $\overline{00}$ to $\overline{03}$ of $\overline{0}$ output 16 and sign data is available on lines R6 of R output 17. Both the stitch data and sign data are stored in latch memory 26 and 27 respectively as needle position data and work feed data. The stored needle position data is strobed (gated) from latch memory 26 by the rising edge of the synchronous pulse from the R7 line of R output 17 and impressed upon (transferred to) needle position drive unit 29. The other work feed data is strobed (gated) from latch memory 27 by the falling edge of the synchronous pulse and impressed upon (transferred to) work feed drive unit 30. A clutch signal is supplied from R8 of R output 17 if necessary and also a skip signal is supplied from R9.

Figure 3:
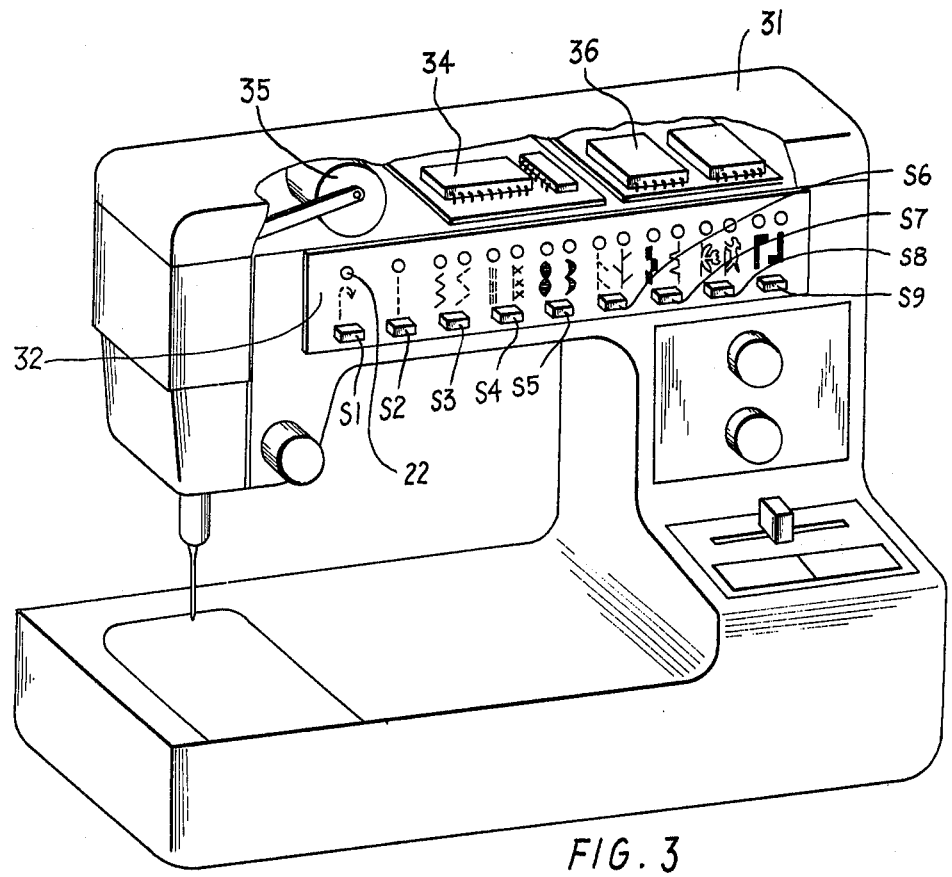
FIG. 3 is a perspective view of a sewing machine including the pattern selection switches and a fragmentary view of the electronic components necessary to this invention.

FIG. 3 of the drawings illustrates a perspective outer view of a sewing machine embodying a working model of this invention. Illustrated in the partially cutout portion of machine body 31 is printed circuit board 34 for the electronic control elements which contain microcomputer 1 as the basic component. Actuator 35 utilized as the needle position drive unit 29 in FIG. 2, and amplifier circuit board 36 for controlling the above actuator 35 can also be seen. The selection keys S1–S9 are furnished on pattern selection panel 32 with the 00812 LED's 22 arranged above and in abutting relationship with a corresponding stitch pattern symbol on this key panel as a stitch pattern display. The LED's are illuminated when a corresponding pattern is selected from ROM 6 of microcomputer 1.

Figure 4:
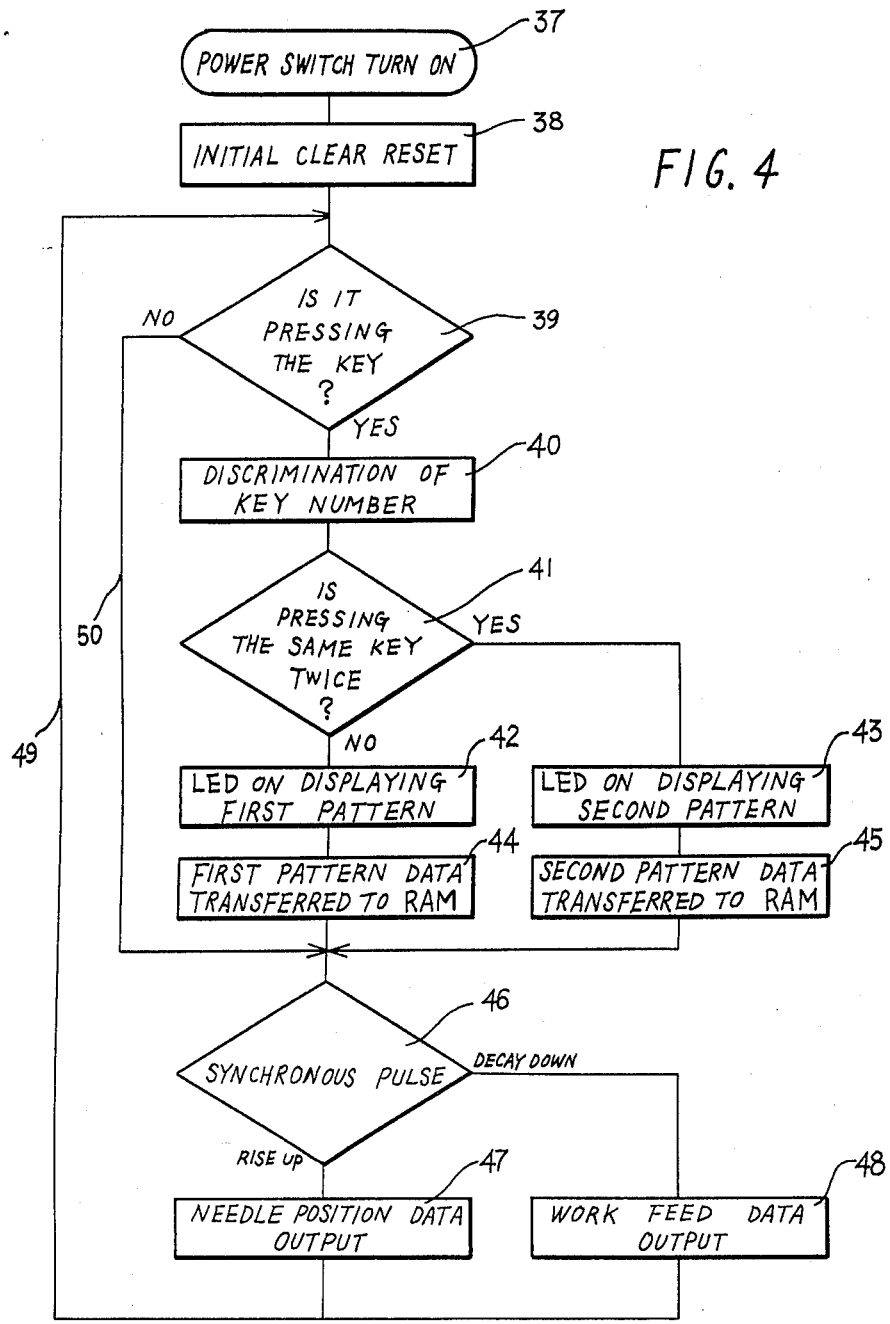
FIG. 4 is a flow chart indicating the control steps of stitch pattern generation.

FIG. 4, a flow chart is illustrated to explain the functional steps of microcomputer 1. When the power supply is turned on as indicated by numeral 37, an initial CLEAR RESET is executed at 38 and all inputs, outputs, program counter 7 and RAM 13 are cleared. Immediately thereafter, the stitch pattern keys are scanned by a program stored in the starting address of ROM 6. Thus, lines R0 to R5 of R output 17 are scanned successively and each scanning pulse is inverted to a "1" by inverter 23 cyclically in each drive line.

When any key S1 to S9 is not pressed, discrimination step 39 indicates NO and this signal reaches discrimination step 46 where a synchronous pulse supplied from the K8 line of K input 3 is checked. When a NO signal is present, the program by-passes steps 47 and 48 and returns back to discriminating position step 39 and this process is repeated again.

When one of the keys S1 to S9 is pressed for selection, (when two keys are pressed simultaneously, the circuit 40 can determine which key was depressed first and determine priority) discrimination step 39 indicated YES and either one of receive lines K1 or K2 of K input 3 which is connected to the selected key as shown in FIG. 2 becomes a "0" because of pull up resistor r0. This "0" signal on input line K1 or K2 and the "1"

signal on output line R are read into microcomputer 1 where it is determined which key position is pressed (step 40) and the determination is stored in a specified area of RAM 13. A repeat key press is also checked at the step 41 and when the key is not pressed twice, the stitch pattern correlated with the selected switch is displayed by an LED 22 as shown at step 42. ROM 6 stores the selected pattern and is addressed by program counter 7. All information concerning the selected stitch pattern is transferred to a specified area of RAM 13 as shown at step 44 by the waiting synchronous pulse supplied from the K8 line of K input 3 circuit. When the synchronous pulse rises up, the first needle position and sign data is picked out from the stitch data which has been transferred and stored in a specified area of RAM and is transferred into latch memory 26 through lines $\overline{00}$ to $\overline{03}$ of 0 output 16 and R6 of R output 17. The rising edge of the synchronous pulse is delayed and appears on line R7 of R output 17 to strobe latch memory 26 and transfer the data to the needle position drive unit 29. When the falling edge of synchronous pulse signals is detected (step 46), the first work feed data word and its related sign data to form the complete stitch pattern, also previously stored in RAM 13, is fed from lines $\overline{00}$ to $\overline{03}$ and R6 to latch memory 27 and stored therein when the related delayed signal of the synchronous pulse from output line R7 is inverted by inverter 28 and gates or strobes latch memory 27 to transfer these data to work feed drive unit 30.

The flow chart then follows through flow line 49 and reaches again discrimination step 39. As long as any other key is not depressed, at the time the succeeding rising or falling edge of the next synchronous pulse appears at K8, succeeding stitch pattern data are successively transferred from the RAM and supplied to the drive unit where they are executed as each stitch.

After the key is scanned at discrimination step 39, and the type of key pressed is determined (step 40), if the same key is depressed twice, it is recognized at discrimination step 41 and indicates YES to illuminate the LED representing the 2nd pattern (step 43). Program counter 7 jumps to the address of the 2nd pattern data in ROM 6. This pattern data can then be transferred to RAM 13 and dealt with such as indicated in the preceding process.

By way of example only, the data for a few starting stitch pattern words in ROM 6 of microcomputer 1 is shown in Table 1. A is the jumped address of a related selected key and is addressed successively by an instruction from program counter 7.

TABLE 1

| Address | Instruction (TCMIY) | Data LSB | | | | MSB | | | | |
|---|---|---|---|---|---|---|---|---|---|---|
| | | | | | | Needle position sign | | | | |
| | | | | | | | Work feed sign | | | |
| | | | | | | | | Skip data | | |
| | | | | | | | | | Clutch data | |
| A     | 0 1 1 0 | 1 | 0 | 0 | 1 | -Control data | Stitch pattern data for one stitch |
| A + 1 | 0 1 1 0 | 0 | 1 | 0 | 1 | -Needle position data | |
| A + 2 | 0 1 1 0 | 1 | 1 | 0 | 0 | -Work feed data | |
| A + 3 | 0 1 1 0 | 1 | 0 | 0 | 1 | | |
| A + 4 | 0 1 1 0 | 1 | 0 | 1 | 0 | | |
| A + 5 | 0 1 1 0 | 0 | 1 | 1 | 1 | | |
| A + 6 | 0 1 1 0 | 0 | 0 | 1 | 1 | | |
| A + 7 | 0 1 1 0 | 1 | 0 | 1 | 1 | | |
| A + 8 | 0 1 1 0 | 1 | 0 | 0 | 1 | | |
| A + 9 | 0 1 1 0 | 0 | 0 | 1 | 1 | | |

By way of example, when the stitch pattern data is stored in the memory of ROM 6, the pattern data representing only one stitch are stored as 3 words as shown in Table 1. The upper or most significant 4 bits out of 8 bits for one word stores an instruction word such as "transfer the data of the lower 4 bits into the designated address of RAM 13 following the instructions from X register 14 and Y register 15 and increment the Y register" which corresponds for example, to TCMIY as a Mnemonic code and "0110" as a machine code.

In the lower or least significant 4 bits of an 8 bit word, for example in address A of Table 1, the most significant bit (MSB) stores clutch data which controls a semiconductor and, for example, drives a solenoid to fix the needle in its middle position during the course of straight line stitching. The next significant bit stores skip data which holds the needle at an upper dead position by a solenoid or the like which is also controlled by a semiconductor. The skip data stores a "1" when a skip is needed and a "0" when it is not needed. The next succeeding significant bit stores sign data which indicates work feed direction either forward or backward (for example "0" means forward and "1" means backward). The succeeding least significant bit stores sign data which indicates lateral jogging of the needle from its middle point to either the left hand side or the right hand side (for example "0" means left jogging and "1" means right jogging).

The next word, namely address A+1, consists of an instruction word which also contains TCMIY for the upper 4 bits and the lower 4 bits contain data indicating lateral needle jogging. The succeeding word, such as address A+2, contains data for work feed length for the lower 4 bits. As mentioned above, the 3 words, when combined, indicate the whole stitch pattern data for one stitch of the needle and the succeeding stitch is instructed by same procedure with 3 words and continuously repeated. Of course, with this construction of stitch data, the lower 4 bits for pattern data may be selected at will and any desired pattern data stored may be selected by pressing a pattern selection switch on the control panel.

It is not illustrated in the flow chart of FIG. 4, but when a "1" is stored for clutch data or skip data, at process step 47 or 48 respectively, in FIG. 4, line R8 or R9 of the R output shown in FIG. 2 becomes a "1" and causes the drive circuit to drive a solenoid or the like.

Figure 6:
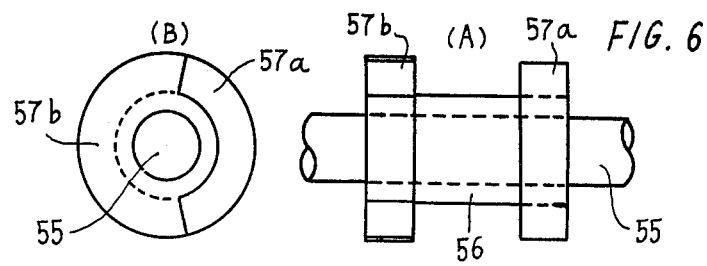
FIG. 6 (A) is front view of the cam mechanism used in this invention.

FIG. 5 of the drawings illustrates a perspective view of a cam mechanism and detector unit for the synchronous signal generator in accordance with this invention. One pair of magnetic resistance elements, 53a and 53b, are used as detector elements and are attached respectively on the surface of permanent magnets 52a and 52b (approximately 5 mm square and 3 mm thick) on the common detector board 51. These magnetic resistance elements are connected in a series circuit and have 4-5 volts of stabilized DC voltage applied thereto at two terminals (1)-(3). The middle point of the two series connected magnetic resistance elements is connected to terminal (2). The detector unit of such a construction is fixed to the machine body by screws with bracket 54, or the like, of non-magnetic material. Support ring 56 is fixed to main shaft 55 of the sewing machine and a pair of nearly half circular cams 57a and 57b are also fixed to the support ring. Each cam 57a and 57b has a circular peripheral face which is arranged a slight distance (about 0.5 mm) above and parallel to the surface of the magnetic resistance elements. The cams are made of magnetic material such as pure iron or the like. The circular arc angle of semi-circular cams 57a and 57b is approximately 180 degrees which may vary depending upon the stitch forming construction of the sewing machine. These cams are utilized to control the timing of the needle position and work feed mechanism and are installed so as to make up a whole circle with the semi-circular surface of each cam, 57a and 57b, complementing the other as shown in FIG. 6 (B). If necessary, the cams 57a and 57b may be fixed to the main shaft 55 directly instead of a support ring.

When main shaft 55 revolves following the arrow direction of FIG. 5, and circular cam 57a approaches magnetic resistance element 53a while simultaneously circular cam 57b leaves magnetic resistance element 53b, the resistance of magnetic resistance element 53a increases rapidly and, to the contrary, the resistance of element 53b decreases also by the magnetic resistance effect. Consequently, as a constant voltage is applied between the two terminals (1) and (2) of the detector unit, the voltage between terminals (2) and (3) drops steeply. As main shaft 55 continues to revolve, the voltage output between terminal (2) and (3) is kept constant because the gap between the circular periphery of cam 57a and magnetic resistance element 53a is constant. When the end of cam 57a passes over magnetic resistance element 53a, the resistivity of this element decreases rapidly and at the same time the end of cam 57b entered the territory of magnetic resistance element 53b and the resistivity of magnetic resistance element 53b increases rapidly which causes the voltage between terminals (2) and (3) to rise up steeply. The curve of the voltage output generated by the revolution of main shaft 55 is illustrated in FIG. 7 where FIG. 7 (A) shows the output voltage between the terminals (2) and (3) of the detector unit and the solid line corresponds to 1 cycle of detection. FIG. 7 (B) shows output voltage curves appearing between terminals (1) and (2) which are of opposite polarity.

Figure 8:
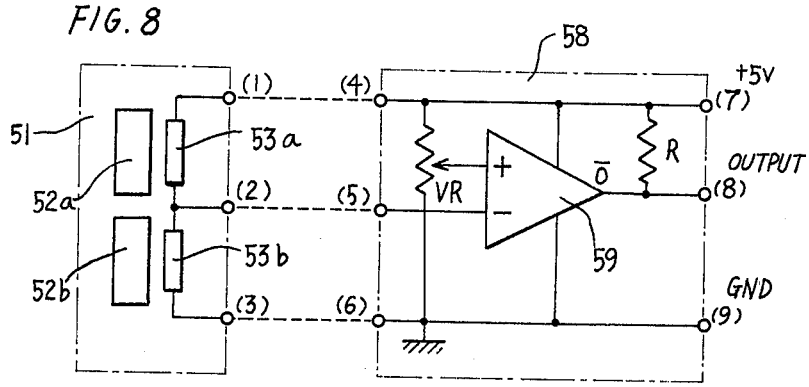
FIG. 8 is a diagrammatic illustration of the synchronous signal generator electrical circuit.

FIG. 8 is a schematic diagram of the synchronous signal generator embodied in this invention. The terminals (1), (2) and (3) of detector board 51 which correspond to the 3 terminals of FIG. 5 are connected respectively to the terminals (4), (50) and (6) of comparator board 58. The comparator 59 is usually formed of an integrated circuit and when DC voltage is supplied between terminals (7) and (9), it becomes operative. Usually about half of the source supply voltage, i.e., 2.5 volts, is supplied on the positive input terminal through semi-fixed variable resistor, VR. A rectangular pulse from detector board 51 shown in FIG. 7 (A) is applied to negative input terminal (5). When a detection voltage is generated over −2.5 V, a rising voltage pulse (RISE UP in FIG. 4) appears at the output terminal (8) and conversely, when a detection voltage is generated under −2.5 V, a falling pulse (DELAY DOWN in FIG. 4) appears at the output. Output terminal (8) thus supplies a voltage to control succeeding electronic circuits where the rise and fall voltage is utilized for synchronized timing with each machine main shaft revolution and becomes a source for synchronizing the stitch mechanism for needle penetration and work feed position. Further, the resistor R is connected to the output 0 of comparator 59, and because such resistor connection is matched for the open collector output of this comparator circuit, it becomes a pull up resistor for terminal K8 of microcomputer 1. Semi-fixed variable resistor VR can be removed if the input voltage of the comparator is fixed automatically at a half of the supply voltage.

In addition, in the electric circuit of this example, the output voltage between terminals (2) and (3) can be used directly to control an electronic circuit, but it is preferable to insert such an operational amplifier into the comparator board as embodied in the example for increasing stability.

As mentioned in detail as above, this invention can overcome the prior defects of sewing machines which use an electronic circuit for control and memory storage of the stitch pattern. The stitch pattern and program are stored in the ROM of microcomputer 1 because it is easily available as an integrated device with low cost and a short time delivery. Moreover, a microcomputer is favorable for design and production of home use sewing machine because software can develop various applications and the functions can be increased. For example, the pattern selection technique set forth above may be expanded with superior operation. The synchronous signal generator utilizing magnetic resistance elements shows superior temperature characteristics and supplies a stabilized synchronous pulse and offers high performance of the sewing machine.

While the specific form of the driving device is shown herein for converting the electrical information delivered in accordance with the pattern information stored in the memory into proportional mechanical movement for controlling the bight and feed increment, it will be understood that the present invention is not so limited, but includes within its scope any type of electronic logic wherein a coded electrical signal is converted into a proportional mechanical movement.

Having thus set forth the nature of this invention, what is claimed herein is:

1. In a sewing machine having a memory for storing stitch pattern data, a plurality of pattern selection switches, each corresponding to at least one of said stored patterns, and a microprocessor for accessing said stitch patterns in accordance with a selected pattern switch, the improvement comprising;

a. a plurality of data words representing each stitch in a stitch pattern stored in said memory beginning with a starting address, b. means coupled to said memory for selecting the starting address of a selected, stored stitch pattern, and c. means coupled to said memory for successively gating each of the plurality of data words representing each stitch of the selected stitch pattern to said stitch forming mechanism to form each stitch of said selected stitch pattern, said means for successively gating data words comprising:

i. a main shaft for driving said needle position and work feed mechanism, and ii. means associated with said shaft for developing a synchronous timing signal in synchronism with said main shaft rotation for successively gating said data words and comprising:

(1) first and second permanent magnets, (b 2) a magnetic resistance element mounted on each of said permanent magnets, (3) a DC potential applied to said magnetic resistance elements in series, and (4) first and second magnetic cams mounted on said main shaft in operative association with a corresponding one of each of said magnetic resistance elements to produce alternate polarity pulses from said resistance elements as said shaft is rotated.

2. A sewing machine as in claim 1 wherein said cams are mounted on said main shaft such that when one cam is associated with its respective magnetic resistance element to cause a pulse of one polarity to be produced, the other cam is causing a pulse of opposite polarity to be produced by its associated magnetic resistance element.

3. A sewing machine as in claim 2 wherein the rising and falling edges of said square waves are used to gate said stitch pattern data to said needle position and work feed mechanism for forming said selected stitch pattern.

4. In a sewing machine having a memory for storing stitch pattern data, a plurality of pattern selection switches, each corresponding to at least one of said stored patterns, and a microprocessor for accessing said stitch patterns in accordance with a selected pattern switch, the improvement comprising:

a. a plurality of data words representing each stitch in a stitch pattern stored in said memory beginning with a starting address, b. means coupled to said memory for selecting the starting address of a selected, stored stitch pattern, c. means coupled to said memory for successively gating each of the plurality of data words representing each stitch of the selected stitch pattern to said stitch forming mechanism to form each stitch of said selected stitch pattern, d. drive lines coupling said pattern selection switches and said microprocessor, e. output lines from said microprocessor crossing said drive lines to form a matrix array, and f. a light emitting diode coupling said drive lines and output lines at each intersection whereby when a switch is activated to select a particular stitch pattern, a corresponding diode is illuminated.

5. A sewing machine as in claim 4 wherein each of said diodes is physically located in an abutting relationship to a corresponding stitch pattern symbol to give a visual indication of the stitch pattern selected.

6. In a sewing machine having a memory for storing stitch pattern data, a plurality of pattern selection switches, each corresponding to at least one of said stored patterns, and a microprocessor for accessing said stitch patterns in accordance with a selected pattern switch, the improvement comprising:

a. a plurality of data words independently accessible from the memory and representing each stitch in a stitch pattern stored in said memory beginning with a starting address, b. means coupled to said memory for selecting the starting address of a selected, stored stitch pattern, and c. means coupled to said memory for successively gating each data word of each stitch of the selected stitch pattern to said stitch forming mechanism to form each stitch of said selected stitch pattern.

7. A sewing machine as in claim 6 wherein said plurality of data words for each stitch in a stitch pattern comprise:

a. a first data word representing control data, b. a second data word representing needle position data, and c. a third data word representing work feed data.

8. A sewing machine as in claim 7 wherein:

a. said needle position data word includes needle position sign data, skip data and clutch data, and b. said work feed data word includes work feed sign data.

* * * * *